(12) United States Patent
Kuo

(10) Patent No.: US 6,705,739 B2
(45) Date of Patent: Mar. 16, 2004

(54) BACKLIGHTING MODULE FOR A DISPLAY APPARATUS

(75) Inventor: Chung-Yu Kuo, Tainan (TW)

(73) Assignee: Helix Technology Inc., Hsinchu (TW)

(*) Notice: Subject to any disclaimer, the term of this patent is extended or adjusted under 35 U.S.C. 154(b) by 124 days.

(21) Appl. No.: 10/125,036

(22) Filed: Apr. 18, 2002

(65) Prior Publication Data
US 2003/0198037 A1 Oct. 23, 2003

(51) Int. Cl.$^7$ ................................................ G01D 11/28
(52) U.S. Cl. ........................ 362/26; 362/31; 349/65; 385/146
(58) Field of Search .......................... 362/26, 27, 31; 349/65; 385/146

(56) References Cited

U.S. PATENT DOCUMENTS 6,196,692 B1 * 3/2001 Umemoto et al. ............. 362/31
6,364,497 B1 * 4/2002 Park et al. .................... 362/31

* cited by examiner

Primary Examiner—Stephen Husar
(74) Attorney, Agent, or Firm—Timothy J. Keefer; Wildman, Harrold, Allen & Dixon LLP

(57) ABSTRACT

A light guide of a backlighting module for a display apparatus includes a plate body disposed adjacent to a linear light source in a first direction corresponding to a light propagating direction of the light source. The plate body has first and second surfaces opposite to each other in a second direction that is transverse to the first direction. The light guide further includes a dielectric layer formed on the first surface of the plate body, and a reflective layer formed on one side of the dielectric layer opposite to the first surface of the plate body. The dielectric layer has a refractive index smaller than that of the plate body.

13 Claims, 6 Drawing Sheets

BACKLIGHTING MODULE FOR A DISPLAY APPARATUS

BACKGROUND OF THE INVENTION

1. Field of the Invention

The invention relates to a display apparatus, more particularly to a backlighting module for a display apparatus.

2. Description of the Related Art

Backlighting modules are used to provide illuminating light to liquid crystal displays. Referring to FIG. 1, a conventional backlighting module 1 is shown to include a linear light source 11, a light guide 12, a reflector plate 13, a light diffuser 14, and a prism unit 15 including two prisms 151, 152.

The linear light source 11 is disposed adjacent to a light-incident end of the light guide 12. Light from the linear light source 11 is radiated toward the light guide 12 or is reflected by a reflector 111 toward the light guide 12. By virtue of optical elements on a lower surface of the light guide 12, and by virtue of the reflector plate 13 disposed beneath the light guide 12, which cooperate to impair the total reflection phenomenon, light incident on the light guide 12 is diffused within a certain angular range at an upper light-emergent surface of the light guide 12 toward the light diffuser 14 in a relatively uniform distribution. The light further propagates through the light diffuser 14 and the prism unit 15 for viewing angle adjustment so that the illuminating light can spread out within a certain viewing angle range of a liquid crystal display (not shown).

As the light guide 12 is the main light propagating medium in the backlighting module 1, the shape and material of the light guide 12 determine the luminosity and uniformity of the light from the light-emergent surface of the light guide 12. In order to enhance the luminosity and uniformity of the light from the light-emergent surface of the light guide 12, there are available various methods of forming light guides of different constructions, including injection molding, dot-printing, etching, cutting, sand blasting, etc.

Referring to FIG. 2, the optical elements in the light guide 12 include a plurality of elongated grooves 121 formed by cutting in the lower surface of the light guide 12. Each of the grooves 121 extends in a direction transverse to the light propagating direction of the light source 11. The light-emergent surface of the light guide 12 is also formed with a plurality of elongated grooves 122 that are transverse to the grooves 121. The total reflection effect of the light guide 12 is destroyed by virtue of two reflective surfaces 123 of each of the grooves 121, 122.

The thickness of the light guide 12 in general ranges from several hundredths of a millimeter to several millimeters. The grooves 121, 122 have a depth ranging from 15 to 100 micrometers ($\mu$m, $\mu=10^{-6}$), and a width ranging from 30 to 200 micrometers. Therefore, the depth and width of the grooves 121, 122 are very insignificant when compared to the thickness of the light guide 12.

FIG. 3 illustrates the construction of another light guide 12', which is formed with a plurality of micro-reflectors 125 on a lower surface thereof. Aside from contributing to the impairment of the total reflection effect of the light guide 12', the micro-reflectors 125 can also control the viewing angle distribution of the light emitted from the light-emergent surface of the light guide 12'. By controlling the number of the micro-reflectors 125 on the light guide 12', the light emergent therefrom can be effectively modulated.

In the conventional backlighting module 1 of FIG. 1, the reflector plate 13 is required to reflect light escaping from the lower surface of the light guide 12 or 12' back into the light guide 12 or 12'. However, the use of the reflector plate 13 increases the overall size and weight of the backlighting module 1. Besides, as a clearance, though insignificantly small, is present between the reflector plate 13 and the light guide 12 (12'), there will be loss of light, which will reduce the rate of reflection. Hence, there is a need in the art for an improved backlighting module.

SUMMARY OF THE INVENTION

Therefore, the main object of the present invention is to provide a backlighting module for a display apparatus, which includes a compact light guide that can reduce the overall size of the backlighting module and minimize undesirable loss of light to enhance the reflection rate.

According to the present invention, a backlighting module for a display apparatus includes:

a linear light source;

a light guide including a plate body disposed adjacent to the light source in a first direction corresponding to a light propagating direction of the light source, the plate body having first and second surfaces opposite to each other in a second direction that is transverse to the first direction, the light guide further including a dielectric layer formed on the first surface of the plate body, and a reflective layer formed on one side of the dielectric layer opposite to the first surface of the plate body, the dielectric layer having a refractive index smaller than that of the plate body, the light guide having a light incident end proximate to the light source in the first direction, wherein light from the light source enters into the light guide via the light incident end, is guided by the light guide toward the second surface of the plate body, and exits the light guide via the second surface of the plate body;

a light diffuser disposed on the second surface of the plate body to receive and diffuse light that exits from the second surface of the plate body; and a prism assembly disposed on the light diffuser to receive and distribute light from the light diffuser.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
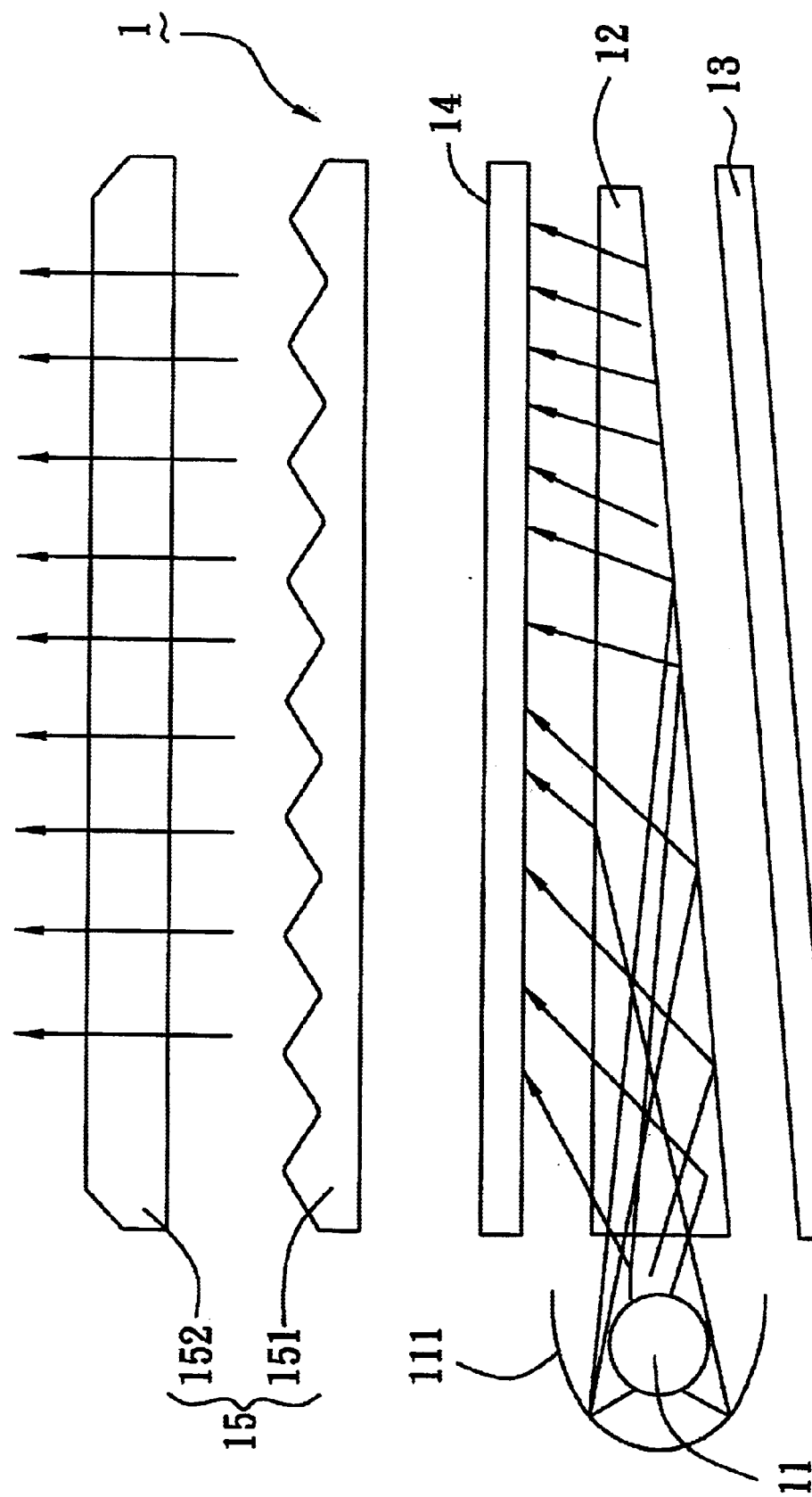
FIG. 1 is a schematic exploded view of a conventional backlighting module.
Figure 2:
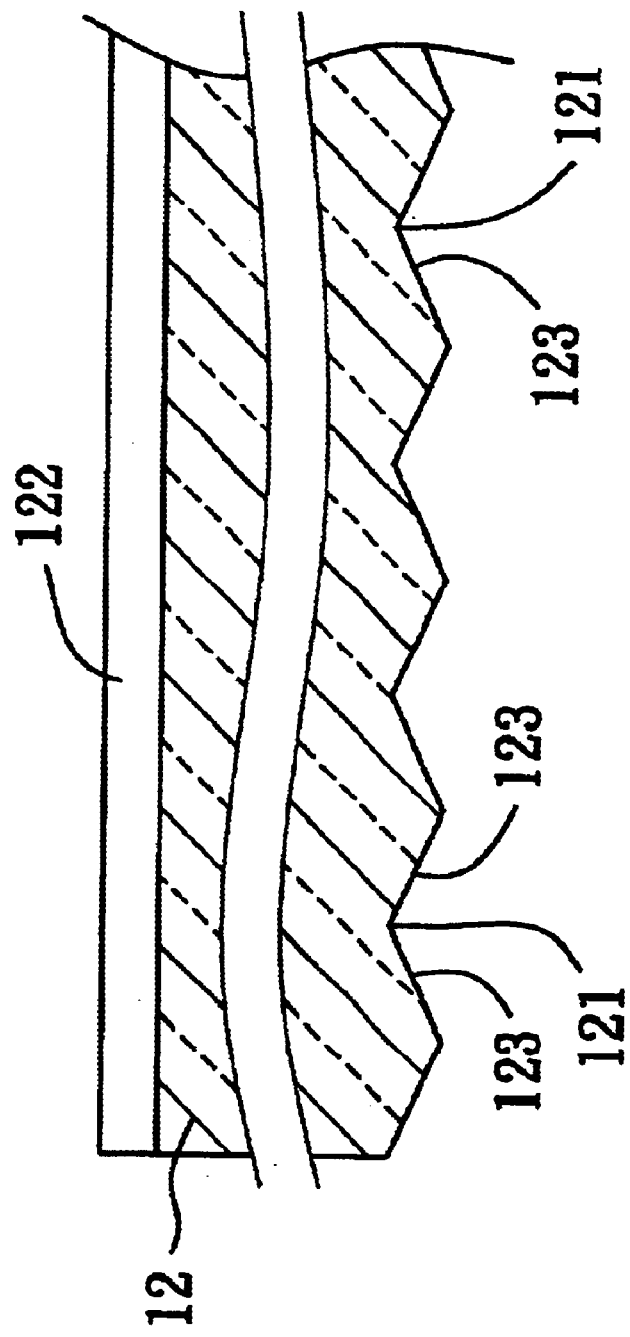
FIG. 2 is an enlarged fragmentary schematic sectional view of a light guide of the conventional backlighting module.
Figure 3:
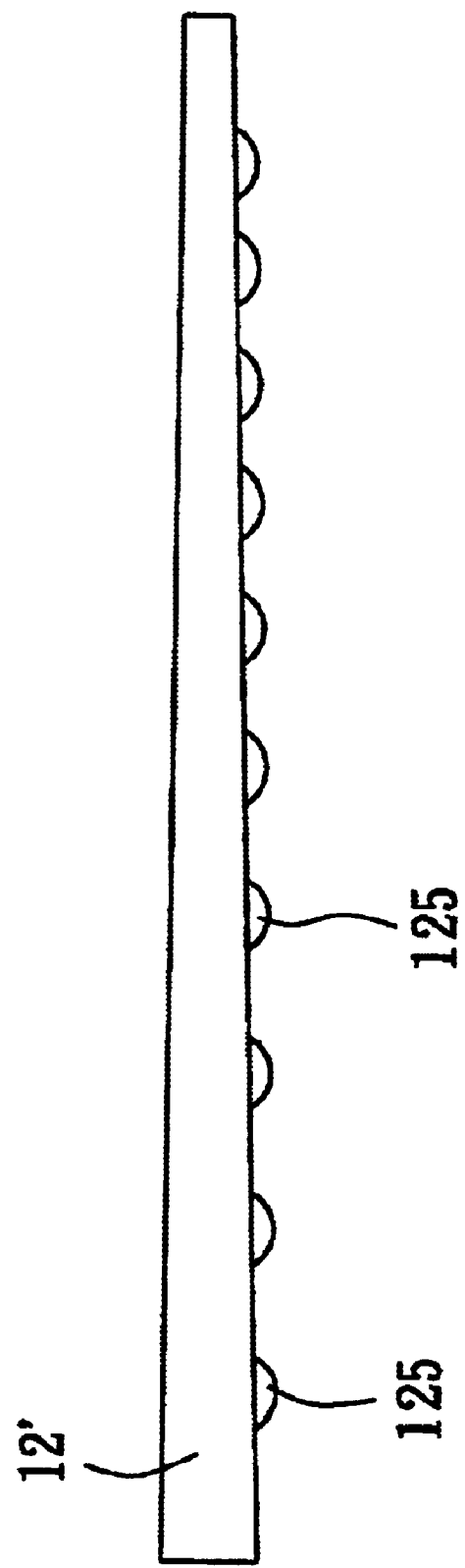
FIG. 3 is an enlarged schematic side view of another conventional light guide.
Figure 4:
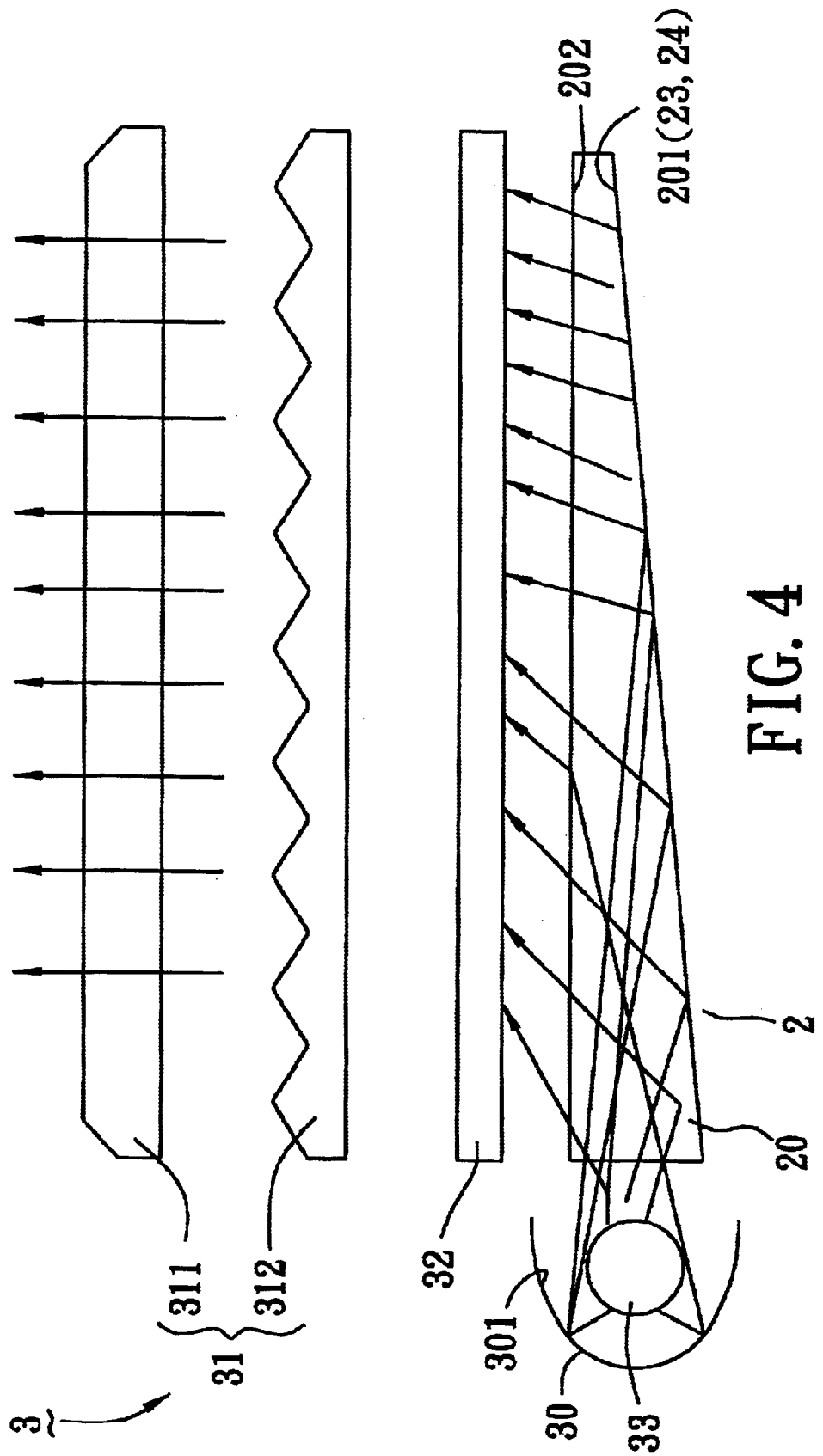
FIG. 4 is a schematic exploded view of the first preferred embodiment of a backlighting module for a display apparatus according to the present invention.

Referring to FIG. 4, the first preferred embodiment of a backlighting module 3 according to the present invention is to be employed in a display apparatus (not shown), such as a liquid crystal display, and is shown to include a reflector 30, a linear light source 33, a light guide 2, a light diffuser 32, and a prism assembly 31.

Figure 5:
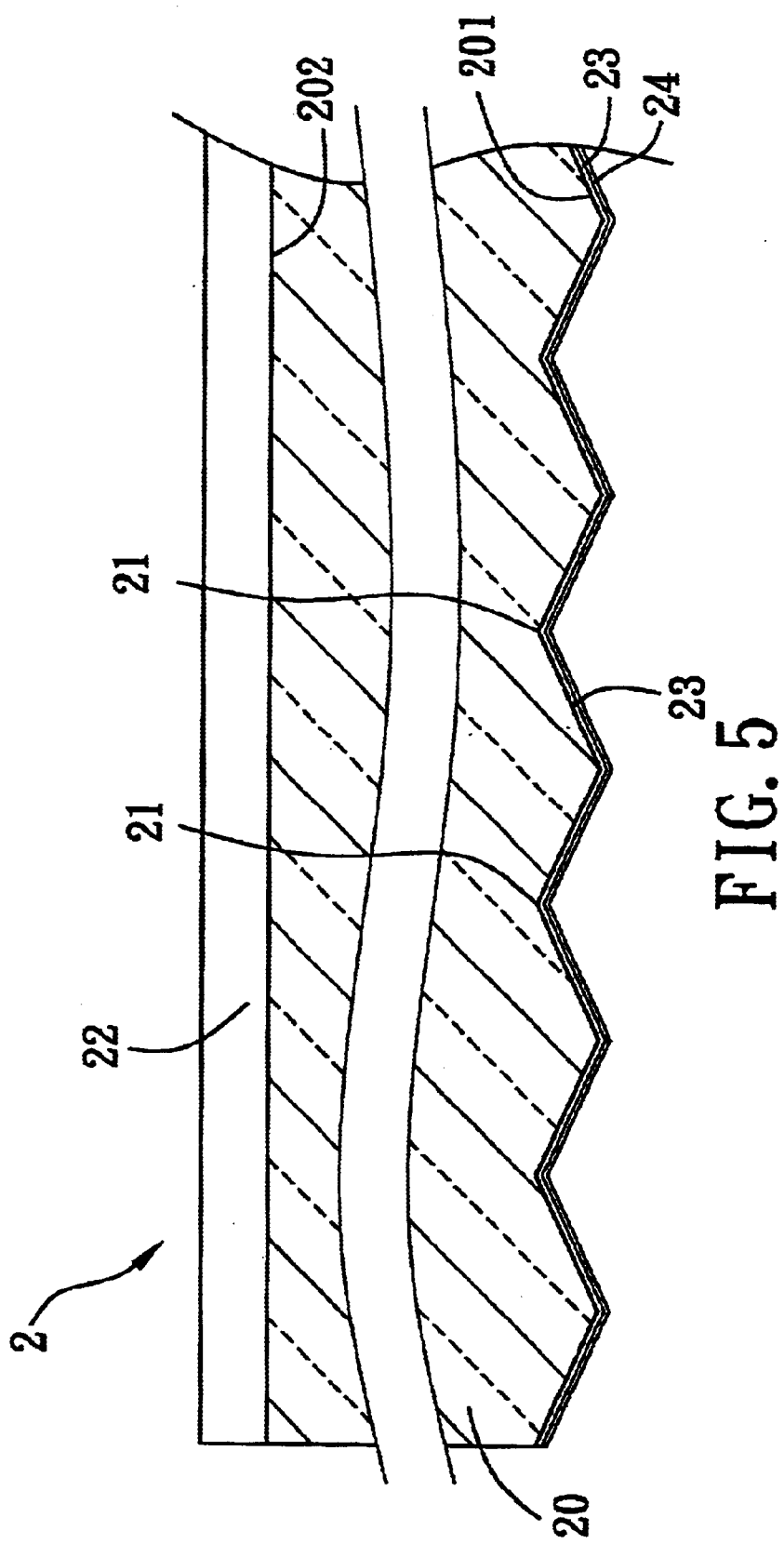
FIG. 5 is an enlarged fragmentary schematic sectional view of a light guide employed in the backlighting module of the first preferred embodiment.

The linear light source 33 is surrounded by a curved reflecting surface 301 of the reflector 30 so that light propagates from the light source 33 along a first direction. The light guide 2 includes a plate body 20 disposed adjacent to the light source 33 in the first direction. The plate body 20 has first and second surfaces 201, 202 opposite to each other in a second direction that is transverse to the first direction. Referring further to FIG. 5, which is an enlarged view (not drawn to scale) of the light guide 2, the first and second surfaces 201, 202 of the plate body 20 are respectively formed with a plurality of elongated grooves 21, 22. The grooves 21 in the first surface 201 are transverse to the grooves 22 in the second surface 202. In addition, the grooves 21 in the first surface 201 are transverse to the first direction. The light guide 2 further includes a dielectric layer 23 formed on the first surface 201, and a reflective layer 24 formed on one side of the dielectric layer 23 opposite to the first surface 201. The dielectric layer 23 is formed by spin coating in a conventional manner, and has a thickness ranging from 10 to 40 micrometers. In addition, the dielectric layer 23 has a refractive index smaller than the refractive index (n=1.49) of the plate body 20 for enhancing emission of light through the second surface 202 and luminance distribution. Preferably, the dielectric layer 23 is formed from magnesium fluoride, which has a refractive index of 1.36, or silicon dioxide, which has a refractive index of 1.45). The reflective layer 24 is formed by sputtering in a conventional manner. Preferably, the reflective layer 24 is formed from a material that has good reflectivity and that has a light color, and has a thickness of about 100 Å (1 Å=$10^{-10}$m). The reflective layer 24 may be formed from a silvery white metal material, such as aluminum or silver. Alternatively, the reflective layer 24 may be formed from a white non-metal material, such as magnesium oxide or titanium oxide.

Referring again to FIG. 4, the light guide 2 has a light incident end proximate to the light source 33 in the first direction. Light from the light source 33 enters into the light guide 2 via the light incident end, is guided by the light guide 2 toward the second surface 202 of the plate body 20, and exits the light guide 2 via the second surface 202.

The light diffuser 32 is disposed on the second surface 202 of the plate body 20 so as to receive and diffuse the light that exits from the second surface 202 of the plate body 20.

The prism assembly 31, which includes superimposed first and second prisms 311, 312, is disposed on the light diffuser 32 to receive and distribute the light from the light diffuser 32.

In use, light from the light source 33 enters the light incident end of the light guide 2 and is reflected by the reflective layer 24 toward the second surface 202 of the plate body 20 for emission toward the light diffuser 32. Since the dielectric layer 23 and the reflective layer 24 are an integral part of the light guide 2, a gap will not be present so that loss of light is negligible and the rate of reflection is improved. As such, the present invention has the following advantages over the aforesaid prior art:

1. As there is no need for a separate reflector plate, the number of components of the backlighting module can be reduced.

2. For the same reason, the backlighting module can be made relatively compact and lightweight.

3. As mentioned above, since the reflective layer 24 is formed by sputtering, no gap will be present so that loss of light is minimized and the rate of reflection is enhanced.

Figure 6:
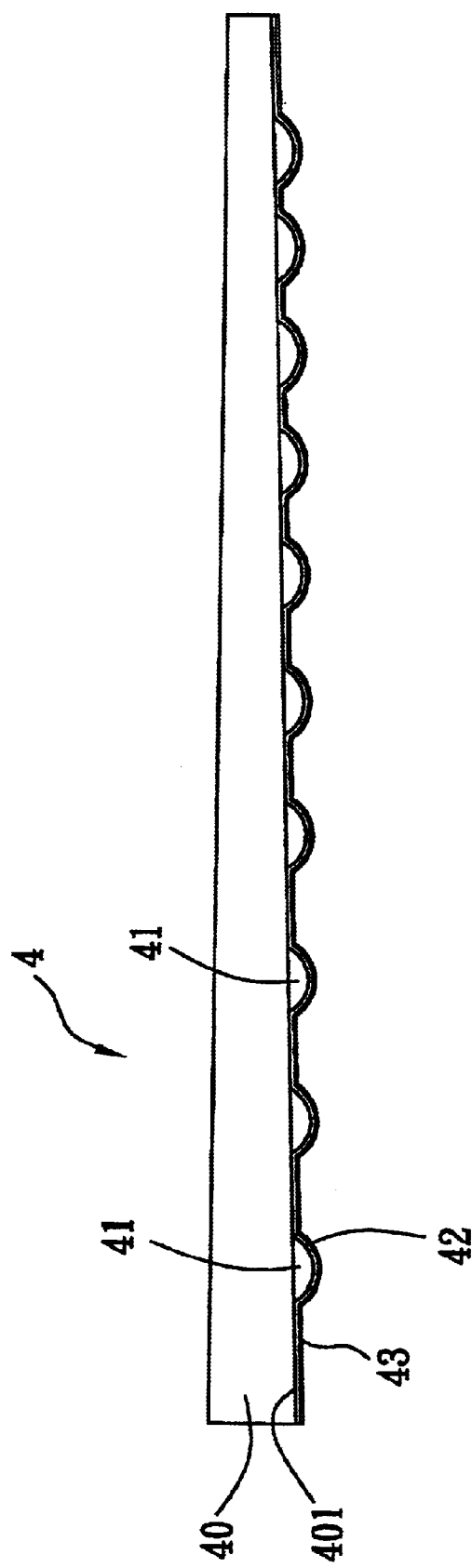
FIG. 6 is an enlarged schematic side view of a light guide employed in the second preferred embodiment of a backlighting module for a display apparatus according to the present invention.

FIG. 6 shows a modified light guide 4 of the second preferred embodiment of a backlighting module according to the present invention. Unlike the light guide 2 of the previous embodiment, the light guide 4 of this embodiment has a plurality of micro-reflectors 41 formed on a first surface 401 of a plate body 40 of the light guide 4. A dielectric layer 42 and a reflective layer 43 are similarly formed on the first surface 401 in the same manner as described above to achieve the same advantages.

It is noted that the light guide according to the present invention can also be applied to those formed by etching, sand blasting or the like to achieve the aforesaid advantages of the present invention.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A backlighting module for a display apparatus, comprising:

a linear light source;

a light guide including a plate body disposed adjacent to said light source in a first direction corresponding to a light propagating direction of said light source, said plate body having first and second surfaces opposite to each other in a second direction that is transverse to the first direction, said light guide further including a dielectric layer formed on said first surface of said plate body, and a reflective layer formed on one side of said dielectric layer opposite to said first surface of said plate body, said dielectric layer having a refractive index smaller than that of said plate body, said light guide having a light incident end proximate to said light source in the first direction, wherein light from said light source enters into said light guide via said light incident end, is guided by said light guide toward said second surface of said plate body, and exits said light guide via said second surface of said plate body;

a light diffuser disposed on said second surface of said plate body to receive and diffuse light that exits from said second surface of said plate body; and a prism assembly disposed on said light diffuser to receive and distribute light from said light diffuser.

2. The backlighting module as claimed in claim 1, wherein said reflective layer is formed by sputtering.

3. The backlighting module as claimed in claim 2, wherein said reflective layer is formed from a silvery white metal material.

4. The backlighting module as claimed in claim 3, wherein the metal material is selected from the group consisting of aluminum and silver.

5. The backlighting module as claimed in claim 2, wherein said reflective layer is formed from a white non-metal material.

6. The backlighting module as claimed in claim 5, wherein the non-metal material is selected from the group consisting of magnesium oxide and titanium oxide.

7. The backlighting module as claimed in claim 1, wherein said dielectric layer has a thickness ranging from 10 to 40 micrometers.

8. The backlighting module as claimed in claim 7, wherein said dielectric layer is formed by spin coating.

9. The backlighting module as claimed in claim 1, wherein said dielectric layer is made from a material selected from the group consisting of magnesium fluoride and silicon dioxide.

10. The backlighting module as claimed in claim 1, wherein each of said first and second surfaces of said plate body is formed with a plurality of elongated grooves.

11. The backlighting module as claimed in claim 10, wherein said elongated grooves in said first surface of said plate body are transverse to said elongated grooves in said second surface of said plate body.

12. The backlighting module as claimed in claim 11, wherein said elongated grooves in said first surface of said plate body are transverse to the first direction.

13. The backlighting module as claimed in claim 1, wherein said first surface of said plate body is formed with a plurality micro-reflectors.

* * * * *